US007233956B2

(12) United States Patent
Balducci et al.

(10) Patent No.: US 7,233,956 B2
(45) Date of Patent: Jun. 19, 2007

(54) METHOD AND APPARATUS FOR DATA MIGRATION BETWEEN DATABASES

(75) Inventors: Corrado Balducci, Woodbridge (CA); Yumman Chan, Rexdale (CA); Feras Dawisha, North York (CA); Ramzan Khuwaja, Thornhill (CA); Brenda Miu-to Lam, North York (CA); Sapna Mahwal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 10/639,954

(22) Filed: Aug. 12, 2003

(65) Prior Publication Data

US 2005/0039113 A1    Feb. 17, 2005

(51) Int. Cl.
G06F 17/30 (2006.01)
(52) U.S. Cl. ...................................... 707/102
(58) Field of Classification Search ............. 707/1–10, 707/100–104.1, 200–206, 513; 715/514
See application file for complete search history.

(56) References Cited

U.S. PATENT DOCUMENTS

| 6,418,400 | B1 | 7/2002 | Webber ........................ 703/22 |
| 6,442,569 | B1 | 8/2002 | Crapo et al. |
| 6,990,632 | B2 * | 1/2006 | Rothchiller et al. ........ 715/514 |
| 2002/0059203 | A1 | 5/2002 | Witkowski et al. ............ 707/3 |
| 2002/0112224 | A1 | 8/2002 | Cox ........................... 717/100 |
| 2002/0120630 | A1 | 8/2002 | Christianson et al. ........ 707/103 |
| 2002/0169788 | A1 | 11/2002 | Lee et al. ................. 707/104.1 |
| 2002/0188629 | A1 | 12/2002 | Burfoot ...................... 707/503 |
| 2003/0030672 | A1 | 2/2003 | Hughes et al. ............... 345/765 |
| 2003/0046317 | A1 * | 3/2003 | Cseri et al. .................. 707/513 |
| 2003/0070144 | A1 | 4/2003 | Schnelle et al. ............ 715/513 |
| 2003/0078766 | A1 | 4/2003 | Appelt et al. .................. 704/9 |
| 2003/0101240 | A1 | 5/2003 | Courtney .................... 709/220 |
| 2003/0106040 | A1 | 6/2003 | Rubin et al. ................. 717/106 |
| 2003/0110191 | A1 | 6/2003 | Handsaker et al. ......... 707/503 |

OTHER PUBLICATIONS

U.S. Appl. titled "Thin Client Framework Deployment of Spreadsheet Applications in a Web Browser Based Environment,"U.S. Appl. No. 10/385,157, filed on Mar. 10, 2003.
Lau, T., et al., "Migrating E-Commerce Database Applications to an Enterprise Java Environment", IBM Centre for Advanced Studies Conference, IBM Press, 2001.
Bourret, R., et al., "A Generic Load/Extract Utility for Data Transfer Between XML Documents and Relational Databases", Advanced Issues of E-Commerce and Web-Based Information Systems, 2000, WECWIS 2000, Jun. 8-9, 2000.

* cited by examiner

*Primary Examiner*—Diane D. Mizrahi
(74) *Attorney, Agent, or Firm*—Samuel A. Kassatly

(57) ABSTRACT

An information handling system comprises an input for receiving a spreadsheet application in static HTML form; a compiler for compiling the spreadsheet application to produce a generic XML document; an interpreter for interpreting the XML document to produce a browser-specific hypertext document representing the spreadsheet; and an output for serving the hypertext document to a client.

33 Claims, 5 Drawing Sheets

METHOD AND APPARATUS FOR DATA MIGRATION BETWEEN DATABASES

CROSS-REFERENCE TO RELATED APPLICATIONS

Not Applicable.

STATEMENT REGARDING FEDERALY-SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems, and more particularly relates to the field of serving spreadsheet applications to thin client systems.

BACKGROUND OF THE INVENTION

A two-tier client/server system is defined as a client/server environment with a two-way interaction in which the user interface is on the client side and the data resides in the server. The application processing logic can be in either the client or the server. In a thin client/fat server system, the application logic is always stored in the server.

A three-tier client/server system is a three-way interaction in a client/server environment in which the user interface resides in the client, the bulk of the business application logic resides in one or more servers, and the data is housed in a database server.

A "thin processing" client, or thin client, is the client side of a client/server environment that performs very little data processing. The client processes only the input/output operations, with all application processing handled by the server.

The ultimate thin client application is based on the concept of a using a browser on the client side of a client/server system through which the client can run server hosted applications without requiring any additional software on the client machine. In essence this means that the complexities of the underlying application are served by the browser without the need of going beyond the software boundaries of what the browser offers on the client machine.

Spreadsheet applications are increasingly important in today's business environment. In order to serve the increasing number of spreadsheet applications tools, programs such as Microsoft's Excel™ have become more complex. An occasional spreadsheet user may have little or no need for the many enhanced features of spreadsheet programs such as these and hence may not want to own a spreadsheet program or to periodically upgrade the program. For these users and for thin clients in particular, it is preferable to access and use a spreadsheet program through their web browser without the necessity of carrying the spreadsheet application on their system. Therefore it is desirable to provide a method and system for remote access and utilization of spreadsheet programs, especially for thin clients.

There are a number of approaches that attempt to provide similar functionality. These include:

The Microsoft Excel 97™ Viewer allows users to view and print Excel 97 and Excel 2000™ spreadsheet files, in addition to other Excel™ for Windows™ spreadsheet files. This viewer gives users the flexibility to view page layout, copy and control cell sizes, and access the zoom and AutoFilter features. However, Microsoft Excel 97 Viewer is only used for viewing static Excel™ spreadsheets; therefore it offers no data binding or write/update capabilities. Special custom coding and programming per application would be required to enable full data binding/read/write capabilities.

Microsoft Excel™ offers a web plug-in component which requires licensing from Microsoft which would make it possible to have full Excel functionality in Microsoft Internet Explorer™ and potentially Netscape™ browsers. The drawback is that it does require the client side to have a license for Microsoft Office™ and to have Microsoft Excel installed.

Sun Microsystems ONE WebTop™ based related technologies make it possible for StarOffice™ spreadsheet applications to be available as a web service over the Internet/Intranet. StarOffice is Sun's spreadsheet application program which also works with Microsoft Excel spreadsheet files. Therefore, utilizing ONE WebTop technology in conjunction with StarOffice facilitates the internet/intranet browser deployment of Microsoft Excel spreadsheets. The client side, however, must have Sun's Java®, hence the solution is not a pure HTML (HyperText Markup Language) browser-based approach.

Tarantella Enterprise 3™ is a server based product which allows users to run any application on a server and access it via the client browser. Tarantella Enterprise 3 software combined with Sun ONE Portal Server and the Sun ONE infrastructure allows users a personalized view for the delivery and aggregation of traditional and Web-based applications into a seamless solution. This solution offers integrated access to Microsoft Windows, Web based, Java, mainframe, AS/400, Linux and UNIX applications. All existing applications are utilized and can be delivered through the portal without rewriting the code, touching the infrastructure or changing the architecture. For example, users can install Microsoft Excel on a machine acting as a server with Enterprise 3 and then have Microsoft Excel running in a virtual manner in a web browser via Tarantella's Enterprise 3 product. This solution, however, relies heavily on Java Applet-related technologies that are expected to exist on the client side, and hence does not provide a pure HTML browser solution.

XHTML (eXtensible HTML) is a freeware tool that transforms an Excel spreadsheet into HTML. It is similar to Excel's own feature of saving the underlying spreadsheet as a static HTML page. The solution is static (i.e., it does not provide the means for generating HTML pages dynamically to provide data binding, read/write capabilities), or providing the means to execute the formulas, and scripts that constitute the underlying spreadsheet application. In short it is identical to using Microsoft Excel's "Save as Web Page" feature that stores the underlying application as a static HTML page.

There are several Java and DHTML (dynamic HTML) based spreadsheets that can be integrated in a web browser, including a product called "yCode" which offers a dynamic HTML based spreadsheet. However, it uses Microsoft Internet Explorer proprietary DHTML technology. It also does not provide the full feature set of a traditional spreadsheet such as dynamic generation of graphics and charts, cell formatting, etc.

Therefore, for these and other reasons, there is a need for a product which overcomes the shortcomings of the prior art.

SUMMARY OF THE INVENTION

An information handling system comprises an input for receiving a spreadsheet application in static hypertext form; a compiler for compiling the spreadsheet application to produce a generic XML document; an interpreter for interpreting the XML document to produce a browser-specific hypertext document representing the spreadsheet; and an output for serving the hypertext document to a client.

DESCRIPTION OF THE PREFERRED EMBODIMENT

We discuss the ultimate thin client architecture, transforming any application into a cross-platform deployable thin client working model via a web browser, providing a pure browser-based solution on the client side. The process framework incorporates dynamic feature capabilities giving it the means to simulate the full "runtime" functionality of the spreadsheet application (e.g., reading/writing data to the bound data source entities, executing scripts and formulas, and generating graphics and charts dynamically per the underlying application's logic) in a commercial web browser without any software requirements on the client machine.

This architecture is based on a classic compiler-interpreter design paradigm which can be likened to that of the Java compiler and the Java Virtual Machine (JVM). In the Java paradigm, a Java program (i.e., an application) is compiled by the Java compiler and the JVM then interprets the output of the Java compiler in order to run the underlying application-specific program properly.

Figure 1:
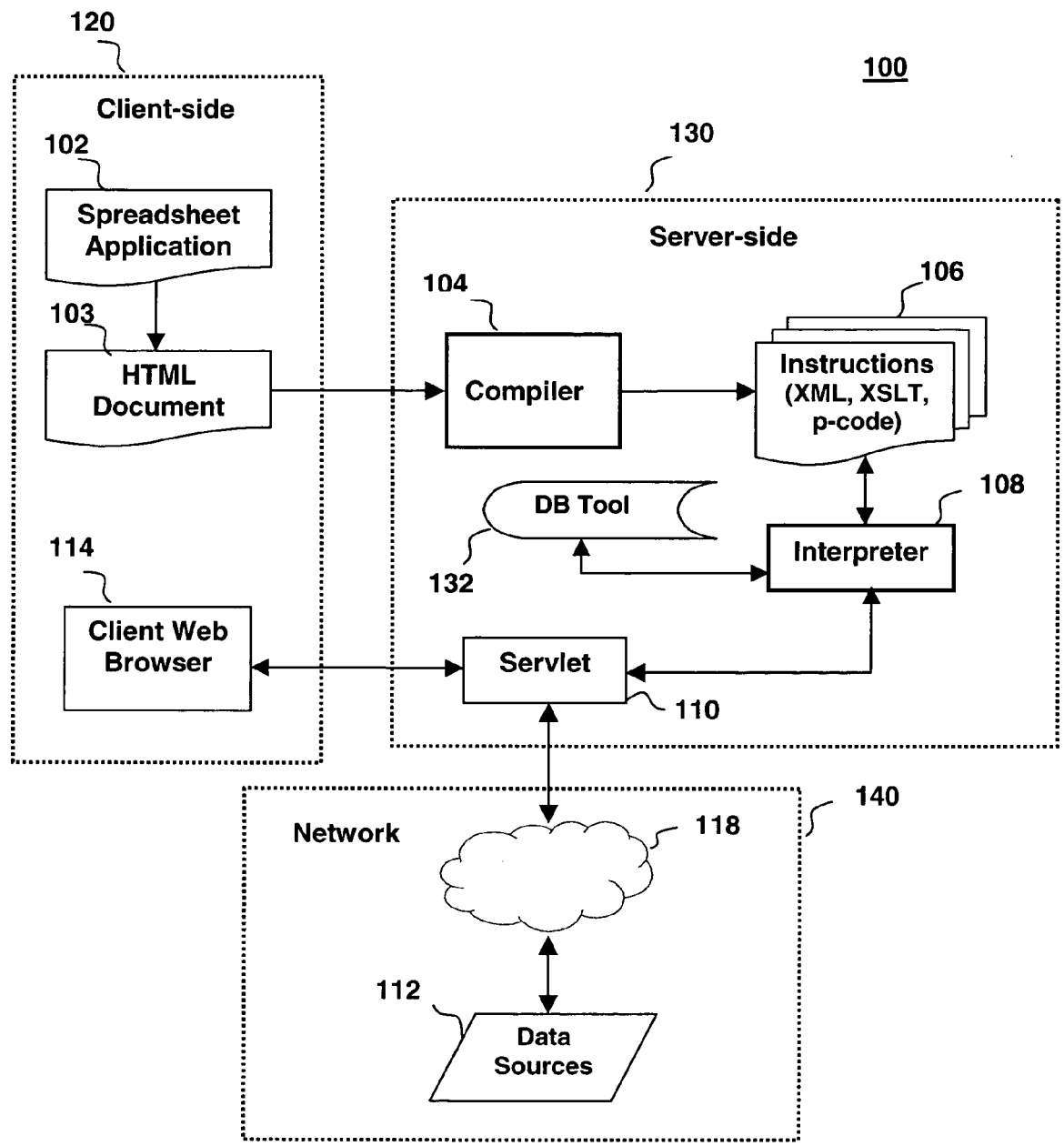
FIG. 1 is an illustration of a thin client deployer architecture according to an embodiment of the present invention.

Referring to FIG. 1 there is shown a flow diagram of the TCD architecture 100, according to an embodiment of the invention. In this model, the application for deployment will be a spreadsheet application. Those skilled in the art will perceive that other applications can benefit from this solution as well. In FIG. 1, the Thin Client Deployer (TCD) Compiler 104 receives as input a description of an underlying spreadsheet application 102 and generates a set of well-defined instructions 106 to be handled and carried out by the Interpreter 108, through the Servlet 110.

Although the Thin Client Deployer 100 provides the means for transforming a variety of spreadsheet applications into Internet/Intranet portals, for purposes of this discussion we will focus our examples on Microsoft Excel spreadsheet applications. As shown in FIG. 1, the two main components of the Thin Client Deployer 100 are the Thin Client Developer (TCD) Compiler 104 and the Interpreter 108. The TCD Compiler 104 receives as input a description of the underlying spreadsheet application 102 (in the form of a static HTML document 103) and generates a set of well-defined instructions 106 to be handled and carried out by the Interpreter 108 to effectuate a dynamic deployment on a Client Web Browser 114 (the Browser).

The TCD Compiler 104 is responsible for compiling not only the spreadsheet presentation format of the document 103 (e.g., which cells are blue, what font is used, formulas contained in each cell, etc.), but also to compile the Data Binding Tool 132 binding information. This binding information comprises which cells or range of cells are bound to what data source 112, and other relative metadata information that is generated by the Data Binding Tool 132 in order for the spreadsheet binding with the underlying data source to take place. The Compiler 104 parallels the processing of a Java or C compiler, where the compiler's job is to compile the specification provided in a program to produce output that is understandable by the underlying operating system. The Compiler 104 takes the data/information that define a given spreadsheet (e.g., its presentation format such as font, color, etc., as well as data-cell binding information as noted by the Data Binding Tool 132, and compiles them all into not machine language, but XML and XSLT. The generated XML and XSLT documents are used by the Interpreter 108 in order to dynamically generate an HTML document. It should be understood that as used herein the terms "XML document" and "XSLT documents" refer to the present forms of the open standard promulgated by the W3C (World Wide Consortium) for defining data elements and these terms also refer to any follow-on or alternative versions of these standards that include the core functionality of these languages.

In this example, the Compiler 104 compiles a static hypertext document, such as an HTML document 103 generated from the underlying spreadsheet application 102, into an XML document 106, along with XSLT (extensible Stylesheet Language) style sheet documents that are utilized by the Interpreter 108 at runtime for interaction and presentation of the application 102 to the targeted web browsers, through the Servlet 110. For each type of targeted web browser (e.g. HTML, WML, etc.) there will be a separate compiler and interpreter for which each type of browser has its own proprietary requirements (e.g. HTML browsers interact within the framework of HTML syntax and language semantic functionality; WML browsers support WML syntax and language semantics). WML (Wireless Markup Language) is a document presentation language similar to HTML, used primarily for handheld devices.

The Interpreter 108 will be responsible for the presentation and execution of the application 102 in the Browser 114. The approach is based on the concept of developing the spreadsheet application 102, compiling it once and then deploying it on all HTML based browsers through a servlet. A servlet is defined as a bridge, or tunnel, through which a client and a server interact. In the embodiment shown in FIG. 1 the Servlet 110 is shown as a separate entity from the Interpreter 108, but other embodiments can be contemplated wherein the Servlet 110 is embodied as processing logic within the Interpreter 108.

The system works as follows. A spread sheet application developer creates the underlying spreadsheet application 102, perhaps using a product such as Microsoft Excel. To bind the spreadsheet cells, a Data Binding Tool 132, such as IBM's Office Connect™ can be used. The Data Binding Tool 132, acting as a middle-tier repository, provides the framework for data binding/reading/writing between the spreadsheet cells and the underlying data source entities which may be located in a database. Middle tier refers to processing that takes place in an application server that sits between a user's machine and a database server. A middle tier server performs the business logic. Optimally, the spreadsheet application 102 is a data aware, data bound spreadsheet application capable of reading and writing data to and from the bound data source object(s) 112. A hypertext document 103 is generated from the spreadsheet application 102, perhaps by saving the spreadsheet as a webpage. In Microsoft Excel™, this is done by selecting the "Save as Web Page Option" in the "File" menu. The hypertext document in this example is an HTML document.

The developer saves the HTML document 103 and then runs it through the TCD Compiler 104. Preferably the input to the TCD Compiler 104 is an XML description of the underlying spreadsheet application 102. For example, assume that the subject spreadsheet application 102 is a Microsoft Excel 97 spreadsheet application 102 which is not XML-compliant. In this case, Microsoft Excel 97 stores the spreadsheet application 102 as a static HTML document. The TCD Compiler 104 will then take this generated HTML document 103 and analyze it in order to extract some metadata and other application specific descriptions. The result of this extraction will produce a set of XML documents 106 comprising the following information:

graphics and charts contained by the underlying spreadsheet application 102;
spreadsheet cell formulas and other scripts that constitute the underlying application's flow and logic;
user interface (UI) Objects (including spreadsheet cells, GUI controls, such as buttons, List Box, etc);
data source binding metadata that constitute the application's read/write to those data sources;
cell formatting information (e.g. font size, background and foreground colors, mask, etc.);
presentation layout of the spreadsheet(s);
XSLT style sheet(s) required for dynamic generation of HTML documents representing the underlying spreadsheet application 102; and
initial data to be displayed on the HTML presentation of the spreadsheet. The data represents the application at the time its development was completed and was saved into the middle-tier repository (the Data Binding Tool 132).

Once compiled, the output is stored in the server side. Keep in mind that the client in this example is a thin client with only a browser loaded. The goal of this architecture 100 is to provide to a client the functionality of spreadsheet and data binding software without the client having to own and maintain it. Only one compilation is required, regardless of the flavor and quantity of Browsers 114 targeted for deployment. Keep in mind that, similar to any other computer program, if additional enhancements are made to that spreadsheet application 102, the TCD Compiler 104 needs to be re-run to reflect the new changes in its generated output to the Interpreter 108.

The deployment proceeds dynamically and involves connection to the Servlet 110 which acts as a communication channel between the Browser 114 and the Interpreter 108. Once connected, the user is presented with the same functionality that IBM Office Connect Web Client offers, including user login, and being able to select a spreadsheet application 102 from the list of available stored spreadsheet applications 102 in the repository 132. The user needs only to have a Browser 114 installed on the client, exemplifying the ideal thin client/fat server paradigm. A discussion of the IBM Office Connect functionality is found in U.S. patent application Ser. No. 09/356,606 titled "Binding Data from Data Sources to Cells in a Spreadsheet" which is hereby incorporated by reference herein.

Once the modified spreadsheet application 102 is selected from the Servlet 110 the Interpreter 108 is notified which in turn takes the necessary actions in order to present the underlying application to the client side HTML Web Browser 114. This is a two-way dynamic where the Servlet 110 has the role of a conduit, facilitating reading, writing and cell binding to a data source 112 over the Internet/Intranet 118.

The Interpreter 108 is responsible for:
dynamic generation of HTML documents resulting from the execution of formulas and an application's flow and logic in the middle tier;
presenting the HTML documents to the client side web browser.

The Interpreter 108 receives and transmits the commands and/or requests made to/from the Client Web Browser 114 during the course of a user's interactions with the Client Web Browser 114 and the underlying application. These include:
dynamic refresh and retrieval of data;
dynamic update of data;
login and logout;
change password;
search repository for templates/spread sheet applications;
dynamic creation of spreadsheet graphical charts;
execution of the formulas, scripts and application logic flow in the middle tier;
dynamic creation of HTML web browser pages to convey the application's logic flow and execution's results to the user (via the browser);
user key and mouse actions resulting in the execution of the underlying application's logic flow.

The manner in which the Interpreter 108 executes an application's flow and logic is based on the instructions that are initially embedded by the Interpreter 108 (per the Compiler's output) in the generated HTML files 103. Then, during the course of the user's interactions with the Browser 114 these instructions are sent (embedded in the HTML document) by the Browser 114 to the Interpreter 108 via the Servlet 110.

Figure 2:
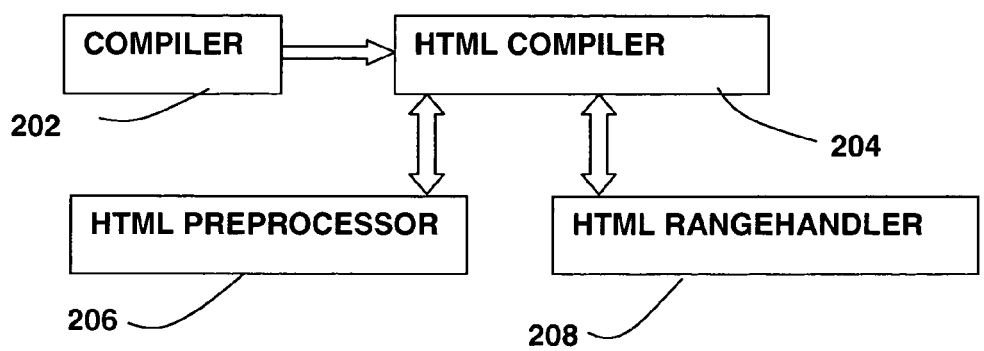
FIG. 2 shows a representation of classes of objects that are used in the compilation process, according to an embodiment of the invention.

Referring to FIG. 2 there is shown a block diagram representation of the classes of objects involved in the compilation process. In keeping with the Java Compiler and JVM paradigm discussed above, the Compiler 104 instantiates classes. These classes include: the Compiler class 202, the HTML Compiler class 204, the HTML Preprocessor class 206, and the HTML Rangehandler class 208.

The Compiler 202

The Compiler 202 class is the main abstract class. It comprises two methods: 1) Compile; and 2) getTheVersionNumber. Each supported Browser 104 will have its own implementation of the above two methods.

The HTML Compiler 204

The HTML Compiler class 204 receives as input the HTML document 103 generated from the spreadsheet application 102. It produces an XML document 106 with embedded pseudo code (p-code) instructions, also containing an XSLT Style Sheet for the Interpreter 108, and an XML document describing the initial data that needs to be displayed on the spreadsheet the first time its is presented to the Browser 114, and finally an XML document describing the graphical charts that need to be dynamically recreated each time a new HTML with new sets of data are generated. Furthermore, the HTML Compiler 204 also creates an XML document defining the formulas contained in the underlying application. This is necessary for spreadsheet-type applications which have embedded formulas.

The XML output 106 generated by the HTML Compiler class 204 consists of four main child elements listed below:
1. InitialDataDisplayed—this is a placeholder for the XML representing the initial data on the spreadsheet.
2. XSLTStyleSheet—The style sheet will also include the required p-code instructions to be embedded as part of the browser page it generates. These p-code instructions are passed to the middle tier Interpreter 108 for the execution of actions and operations done on the spreadsheet.
3. SpreadSheetFormulas—the formula scripts executed on the server side.
4. SpreadSheetGraphics—this is the information for dynamically creating the graphical charts embedded in the spreadsheet application 102.

The InitialDataDisplayed child element is based on the following format:

```
<xmldata>
   <servletAddress>address of the servlet</servletAddress>
   <Range Name1>
      <row rownum="1">
         <column colnum="1">value of column</column>
         <column colnum="2">col2</column>
         ...
      </row>
      <row rownum="2">
         <column colnum="1">value of column</column>
         <column colnum="2">col 2</column>
         ...
      </row>
      ...
</xmldata>
```

The XSLT style sheet generated by the Compiler 204 will transform any given XML document in the format depicted above into an HTML presentation as designed by the spreadsheet developer. This constitutes the "look and feel" of the spreadsheet. The generated XSLT style sheet is based on the p-code depicted in Table 1 below. Note that "TR" is the tag identifier for a table row and "TD" identifies table detail (the fields within the row).

TABLE 1

* Place the HTML Header, BODY, STYLE, FORM tags here
* Special p-code instructions to be understood by the interpreter represented as Hidden INPUT tags
* For (each range name) DO
   For each (row within the range) DO
     If (row ==1) then
       Generate the TR tag and TD tag from Initial spreadsheet
       For each column within the row
         If (column == 1) then
           Generate the TD tag for the first column per original spreadsheet
         Else if (column == 2) then
           Generate the TD tag for the second column per original spreadsheet
         Else if (column == 3) then TABLE 1-continued ...
         Else
           Generate the TD tag based on the default formatting per initial spreadsheet stored
         EndIF
       EndFor /* each column */
     Else if (row == 2) then
       ---
       --- <<the same column loop above is repeated per formatting of the row 2 of the initial spreadsheet.>>
     Else
       Generate the TR and TD tags based on the initial spreadsheet formatting
     Endif
   EndFor /* Each Row */
EndFor /* Each Range Name */

The SpreadsheetFormulas—these are the scripts executed on the server side for data which needs to be manipulated before displaying on the spreadsheet. This is essentially the same functionality available to a client running Excel on his/her system. The Interpreter 108 will execute the formulas according to a user command. The Interpreter 108 may need to access the Data Binding Tool 132 for computational assistance with the formulas.

The Spreadsheet Graphics—this handles the dynamic creation of the charts and other graphics which need to be re-generated every time the Interpreter 108 generates a new HTML document that is sent to the browser side. In another embodiment, the Spreadsheet Graphics are dynamically generated at compile time.

The HTML Preprocessor 206

In order for the Compiler 104 to compile the HTML document 103, it needs to pre-process the document before the actual compilation takes place. This is due to the fact that the HTML document is not XML-compliant. This preprocessing is handled by the HTML Preprocessor class 206 and it will be discussed below with reference to FIG. 4.

The HTML Rangehandler 208

The HTML Rangehandler class 208 analyzes each range as it appears in the generated HTML document 103 and extracts the data it needs for the Compiler 104 to generate the XSLT Style Sheet responsible for dynamically generating the spreadsheet as the data presentation variant changes. Each range defined in a spreadsheet is represented by a table in the HTML document having a number of TR (table row) element tags with each TR having a number of TD (table detail) element tags. As the Rangehandler 208 extracts the required metadata information for each range, this data is stored in a multi-dimensional vector (with the key being the range name). This vector in turn is used by the Compiler 104 for its generation of XSLT style sheets, as well as the XML document containing the graphical chart information defining the spreadsheet layout, as well as the formulas and the initial data that is to be displayed on the spreadsheet the first time it is created.

The Interpreter 108

Figure 3:
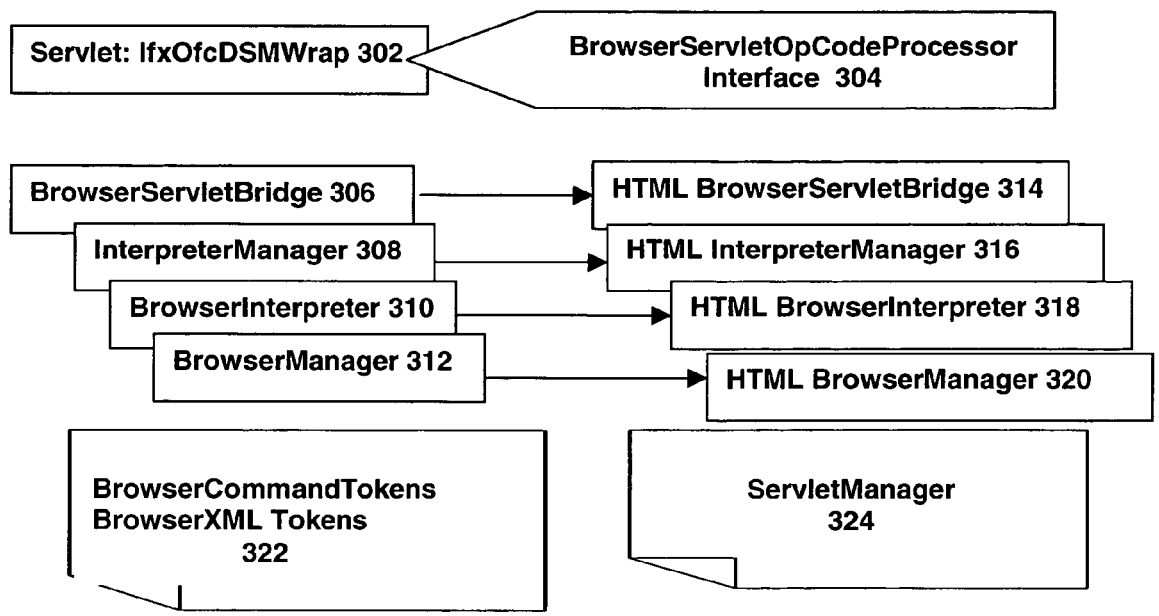
FIG. 3 is block diagram showing the interpreter classes, according to an embodiment of the invention.

Referring to FIG. 3 there is shown a diagram of the classes involved in the Interpreter 108 component of the TCD system 100. To reiterate, the Interpreter 108 interacts with the Browser 114 via the Servlet 110. This interaction is in the form of posted web pages, using the HTTP POST method. Each post includes a special instruction: ClientType=HTMLBrowser. The Servlet 110 looks for this special instruction as each POST takes place and it passes the posted message in its entirety to the Interpreter 108. The Interpreter 108 will then analyze the posted message by examining various embedded p-code instructions in the message as well as arguments that accompany each instruction and it takes action based on those instructions. This will be explained in more detail when discussing FIG. 4.

The Servlet 110 class, IfxOfcDSMWrap 302 implements the BrowserServletOpCodeProcessor Interface 304 The other classes instantiated by the Interpreter 108 are: the Browser ServletBridge 306, the Interpreter Manager 308, the BrowserInterpreter 310, and the Browser Manager 312. Each of these classes spawn derived classes for HTML implementation. These are: HTML BrowserServlet Bridge 314, HTML InterpreterManager 316, HTML BrowserInterpreter 318, and HTML Browser Manager 320, respectively.

Three other classes make up the Interpreter 108: Browser Command Tokens 322 and Browser XML Tokens, and a ServletManager 324. The BrowserCommandTokens class 322 contains all of the token p-code instructions that are embedded in the browser pages generated by the Interpreter 108. These p-code instructions provide the means for the interaction the next time the Browser 114 posts a request to the Servlet 110 as a result of user interaction with that page. Browser XMLTokens 322 contain constants that are representative of XML strings used for building browser-specific XML commands and requests.

The Servlet Manager class 324 deals with content coming from and being sent to the Servlet 110. This content includes XML requests that need to be constructed to abide by the format which the Servlet 110 expects to receive. This class also is responsible for analyzing the XML responses it receives from the Servlet 110 and formats them in the manner that is understood and required by the Interpreter 108.

Figure 4:
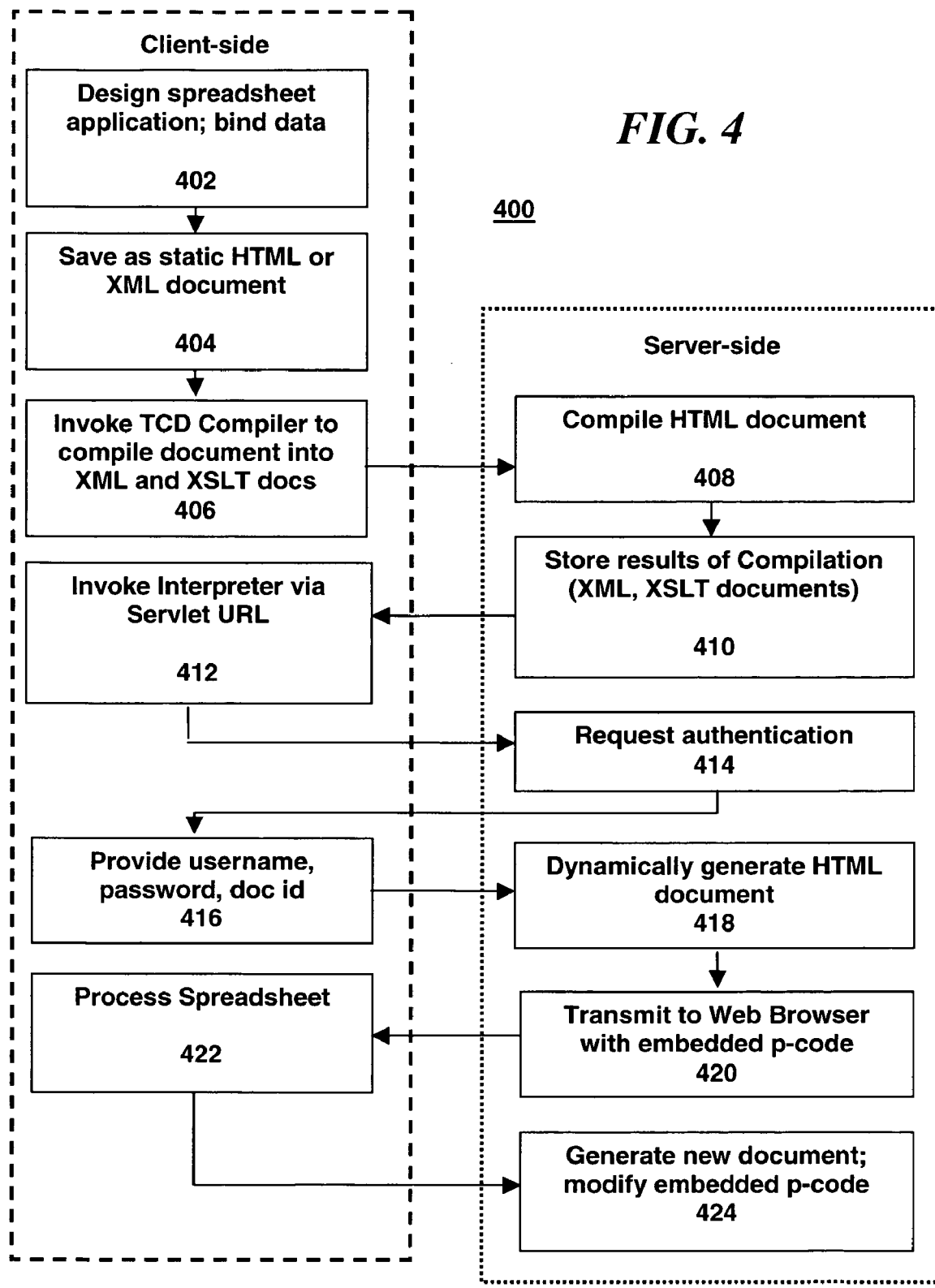
FIG. 4 shows a flow diagram illustrating a method according to the invention.

Referring to FIG. 4 there is shown a high-level flow diagram 400 of the method for deploying dynamically-generated HTML spreadsheets on a thin client's Browser 114. The diagram gives an overview of the processing from both the client-side and server-side perspectives. In the first step, 402, a developer designs a spreadsheet application 102. Optionally, the developer binds data to the cells, perhaps by employing IBM Office Connect. In step 404 the developer saves the spreadsheet as a static XML document, which is feasible if running software such as Office XP. However, if the developer is running software which does not support XML, the spreadsheet can be saved as a static HTML document. In this case, the Compiler 104 would have to perform a pre-compile task in order to convert the spreadsheet into an XML-compliant document. At this point, because the document is a static document, if this spreadsheet were opened in a browser window the user would see what amounts to a snapshot of the original spreadsheet. If the spreadsheet was bound to data, the user would not be able to update or refresh the spreadsheet.

In step 406 the developer invokes the Compiler 104. In step 408 the Compiler 104 compiles the source HTML document 103, producing an XML document 106 containing the source content, format and p-code instructions for interpreting the document. In addition, the Compiler 104 generates XSLT style sheets for displaying the document at the target Browser 114. The spreadsheet application 102 is compiled in two stages: pre-process and compile. During the pre-process stage the generated HTML document will be converted into XHTML (extensible HTML). XHTML enables HTML to be extended with proprietary tags, forming an XML-compliant document. This means that all of the element tags are associated with a matching tag, and all attributes are surrounded by quotes. XHTML more rigorously conforms to structure and syntax rules than does HTML. One example of software which can perform this conversion task is Tidy, a third party free software for transforming input HTML into an XHTML document.

The pre-processor needs to perform additional processing of the resulting XHTML output, including:
  elimination of proprietary syntax which would cause a parser failure (this is due to the fact that XHTML contains proprietary tags);
  making sure that the Style section of the HTML document 103 that contains the entire cell formatting information is included as a CDATA (data which is ignored by a parser) section in order for the XSLT processor to build that section when it generates the HTML page at runtime.

After the compilation process is complete, in step 410 the Compiler 104 stores the resulting documents in the server. These documents detail the appearance and functionality of the spreadsheet to be sent to the target Browser 114.

Step 412 occurs on the client-side with a spreadsheet user (not necessarily the developer) invoking the Interpreter 108 in order to access and perhaps modify the spreadsheet. The user's interface, the Browser 114, cannot communicate directly with the Interpreter 102. Communication between the Browser 114 and the Interpreter 108 must occur through the Servlet 110. All the client has to do is enter the servlet URL (Uniform Resource Locator) address in the browser address field. A servlet is a bridge or tunnel through which a browser on a client machine can send and/or receive information to/from the server. This communication layer between the client and the server is invisible to the client.

Once connected to the Servlet 110, in step 414 the Interpreter 108 requests the user's authentication information by displaying to the user, through the Servlet 110, a request for a user name, password and the identifier for the spreadsheet application the user wishes to access.

In step 416 the user transmits this information to the Interpreter 108 (again, through the Servlet 110). On the server side, the user information is validated by an authentication engine such as the one in Office Connect. Once the access is validated, in step 418 the Interpreter 108 designs and generates the HTML document to be displayed on the client Browser 114. In designing the document, the Interpreter 108 accesses the stored documents which provide all of the details as to the form and content of the requested spreadsheet. The Interpreter 108 in essence reconstructs the original spreadsheet so that it is identical in appearance and functionality to the spreadsheet created in step 402. Therefore, any formulas to which cells are bound have to be executed by the Interpreter 108. For example, cell A23 may contain a formula that causes the values in cell A20 and cell B22 to be added together. This formula needs to be computed by the Interpreter 108 before generating the HTML document. It may be necessary for the Interpreter 108 to access an outside source, such as an Office Connect backend engine, to compute all formulas before generating the HTML document. In this embodiment Office Connect also acts as the Data Binding Tool 132.

In addition, the Interpreter 108 embeds special instructions in the HTML document which take into account all possible allowable interactions/commands a user can perform while viewing the document. These special instructions are designed so that each action taken by the user generates instructions to the Interpreter 108 on what corresponding action to take. The Interpreter 108 can receive commands such as: refresh data; update; login; logout;

change password; search password; and search repository of templates. After the Interpreter 108 generates the HTML document, including the embedded instructions and formula computations, in step 420 the Interpreter 108 posts the document to the Browser 114, using the HTTP POST protocol. This generated HTML document may appear identical to the original document generated in step 402 because the embedded instructions are invisible to the user.

In step 422 the user processes the spreadsheet received as a web page on his/her Browser 114. Whatever action the user takes with respect to the spreadsheet is conveyed to the Interpreter 108. It works as follows: the Browser 114 sends a series of pseudo code instructions to the Servlet 110 through the HTTP protocol. The Servlet 110 in turn passes those pseudo instructions to the Interpreter 108. For example, a user clicks on a button that says "Refresh Data." The document has an embedded script inside it which generates a set of pseudo-code instructions capturing what the user requested. The document then creates a special coded string and through the HTTP Post method (which every HTML browser supports) sends that coded string to the Servlet 110 which transmits it to the Interpreter 108, which in turn interprets the coded command and takes action as appropriate. For every user interaction in step 422, in step 424 the Interpreter 108 generates a new HTML document containing updated data, with another set of embedded instructions based on the last interaction processed. These pseudo instructions are the means through which the Interpreter 108 tracks the user activity with respect to the spreadsheet.

A user interaction involving bound data is processed through the Data Binding Tool 132, perhaps through a back-end engine. Based on the coded pseudo instructions which the Interpreter 108 receives as a result of user input, the Interpreter 108 sends one or more requests to the Data Binding Tool 132 (acting as the repository) for retrieving data from the table to which the spreadsheet is bound. The Data Binding Tool 132 then retrieves the data, and sends the data, along with the binding cell information (established at design time with the original spreadsheet application 102), to the Interpreter 108. The Interpreter 108 adds the data and the data binding information to the HTML spreadsheet before generating the new document. This back-end processing remains invisible to the user.

Figure 5:
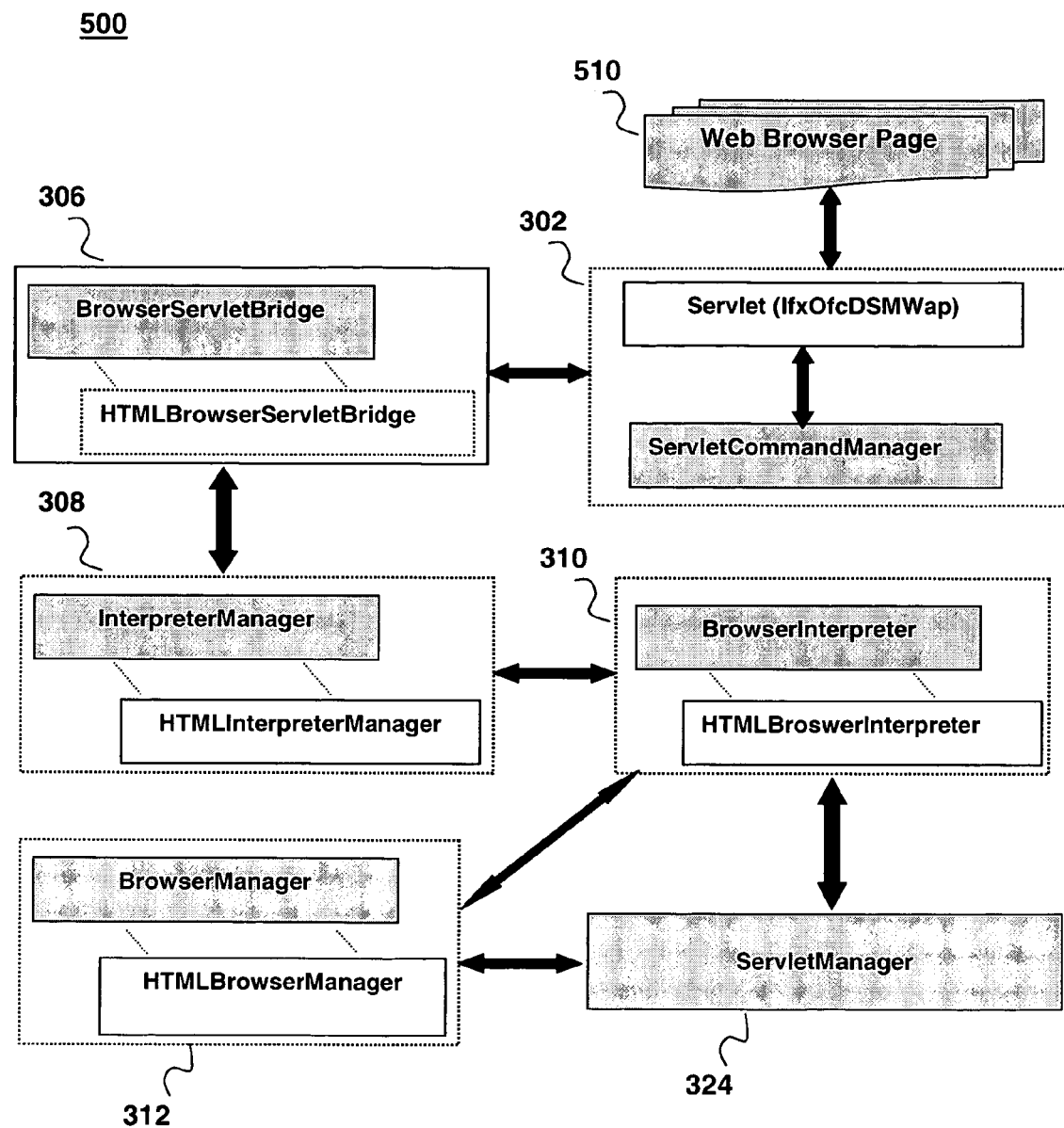
FIG. 5 shows a block diagram representing an overview of the Browser-Servlet-Interpreter interaction and flow.

Referring to FIG. 5 there is shown an overview 500 of the communication and relationship layer between the classes that constitute the Interpreter 108 component. The BrowserServlet Bridge 306 is the base class responsible for delegating requests and commands between the Interpreter 108 and the Servlet 110. These requests and commands will be transmitted via the client's Web Page 510. Keep in mind that in this ultimate thin client paradigm, the client performs all of its read/write/data binding spreadsheet operations through its Web Browser 114. The Bridge's function is to dispatch the Client Web Browser 114 requests to the Interpreter 108. It is also responsible for sending requests and commands to the Servlet 110 (from the Interpreter 108) during the course of interpreting a Browser 114 command. For example, this includes having the Interpreter 108 send a request to the Servlet 110 for a user login command. The Servlet 110 will (via ServletCommandManager 324) honor the commands and dispatch the results back to the caller (in this case the Interpreter 108).

Each supported Client Web Browser 114 will have its own delegation bridge class which is derived from this base class 306. The Servlet 110 creates an instance of the BrowserServletBridge 306 and simply passes all requests coming from the Client Web Page 510 to the derived HTMLBrowserServletBridge. The derived bridge class 515 starts a series of Client Web Browser 114 specific object instantiations. These include the derived classes from the InterpreterManager 308 (HTMLInterpreterManager); the BrowserInterpreter 310 (HTMLBrowserInterpreter); and the BrowserManager 312 (HTMLBrowserManager).

The InterpreterManager 308 is responsible for dispatching the commands received from the BrowserServletBridge 306 to the appropriate handler method. The Interpreter Manager 308 is an abstract layer which utilizes the handler implementation class (derived from the BrowserInterpreter 310) to dispatch the commands transmitted from the BrowserServletBridge 306.

The BrowserInterpreter 310 is an abstract class containing command handler methods that will need to be implemented by each type of supported Browser 114. Each Browser 114 will derive a class from this and provide its own implementation of method handlers defined in the super class (the BrowserInterpreter 310). So, for example, the HTML Interpreter 108 browser's class is called HTMLBrowserInterpreter which is derived from BrowserInterpreter 310 and contains HTML implementation of command handler methods. A WML (Wireless Markup Language) browser class derived from the BrowserInterpreter 310 contains WML-specific command handler methods.

The BrowserManager 312 class deals with browser content issues. This includes creation of browser dependent documents complying with the underlying browser required syntax and semantics, as well as generating XSLT style sheets used for generation of such browser dependent documents. This class contains certain methods that are common to all browsers (such as the creation of XML for presenting data to the XSLT style sheet responsible for creating the main application). However, for obvious syntax and semantic reasons each type of supported browser will derive from this class and will provide its own implementation for creating such documents. For example, an HTML browser derives an HTMLBrowserManager class.

The ServletManager 324 class deals with content, similar to the BrowserManager 312. However, the content this class deals with are those coming from (and being sent to) the Servlet 110. These include XML requests that need to be constructed to abide by the format which the Servlet 110 expects to receive. This class also is responsible for analyzing the XML responses it receives from the Servlet 110 and formats them in the manner that is understood and required by the Interpreter 108.

The BrowserCommandTokens class 322 contains all of the token p-code instructions that are embedded in the browser pages generated by the Interpreter 108. These p-code instructions provide the means for the interaction the next time the Browser 114 posts a request to the Servlet 110 as a result of user interaction with those browser pages. This is basically a static file containing constants representing pseudo instructions that are understood by the Interpreter 108 and are embedded in the HTML documents that are generated by the Interpreter 108. The BrowserXMLTokens are similar to the BrowserCommandTokens. This class contains constants that are representative of XML strings used for building browser-specific XML commands and requests.

The Servlet class 302, also known as the BrowserServletOpCodeProcessorInterface (IfxOfcDSMWrap) implements the BrowserServletOpCodeProcessor interface 304. This interface 304 is implemented by the Servlet 110 in order to provide a delegation bridge between the Interpreter 108 and itself for processing commands and requests that are sent by the Interpreter 108. It contains two methods:

processBrowserRequest takes as arguments an Opcode and the actual command that goes with the Opcode (e.g., $login_{13}$ cmd), and the XML string describing the login_cmd;

getTheServletAddress( ) which returns the address of the Servlet 110 to the caller. Keep in mind that the client accesses the Servlet 110 by transmitting the Servlet's URL address in the client's Browser 114 address field. The Interpreter 108 uses this address in its generation of HTML pages for embedding the address in the ACTION method of the form element in order for the Web Browser Page 510 to post the commands properly.

This is an overview of the process: a command or request is received by the Servlet 110 from the client's Web Page 510. The Servlet 110, through the Servlet Class interface 304 instantiates the BrowserServletBridge class 306 for dispatching the command/request. The BrowserServletBridge class 306 in turn passes the command/request to the Interpreter Manager class 308 for transmitting to the appropriate BrowserInterpreter class 310 for handling. The BrowserInterpreter class 310 gets the browser-specific content information from the Browser Manager class 312 and the application-specific content information from the ServletManager class 324 for appropriately formatting the command/request and then passes this formatted data along to the InterpreterManager class 308 which in turn dispatches the information to the BrowserServletBridge 306 to be communicated via the Servlet class 302 to the client's webpage 510.

Figure 6:
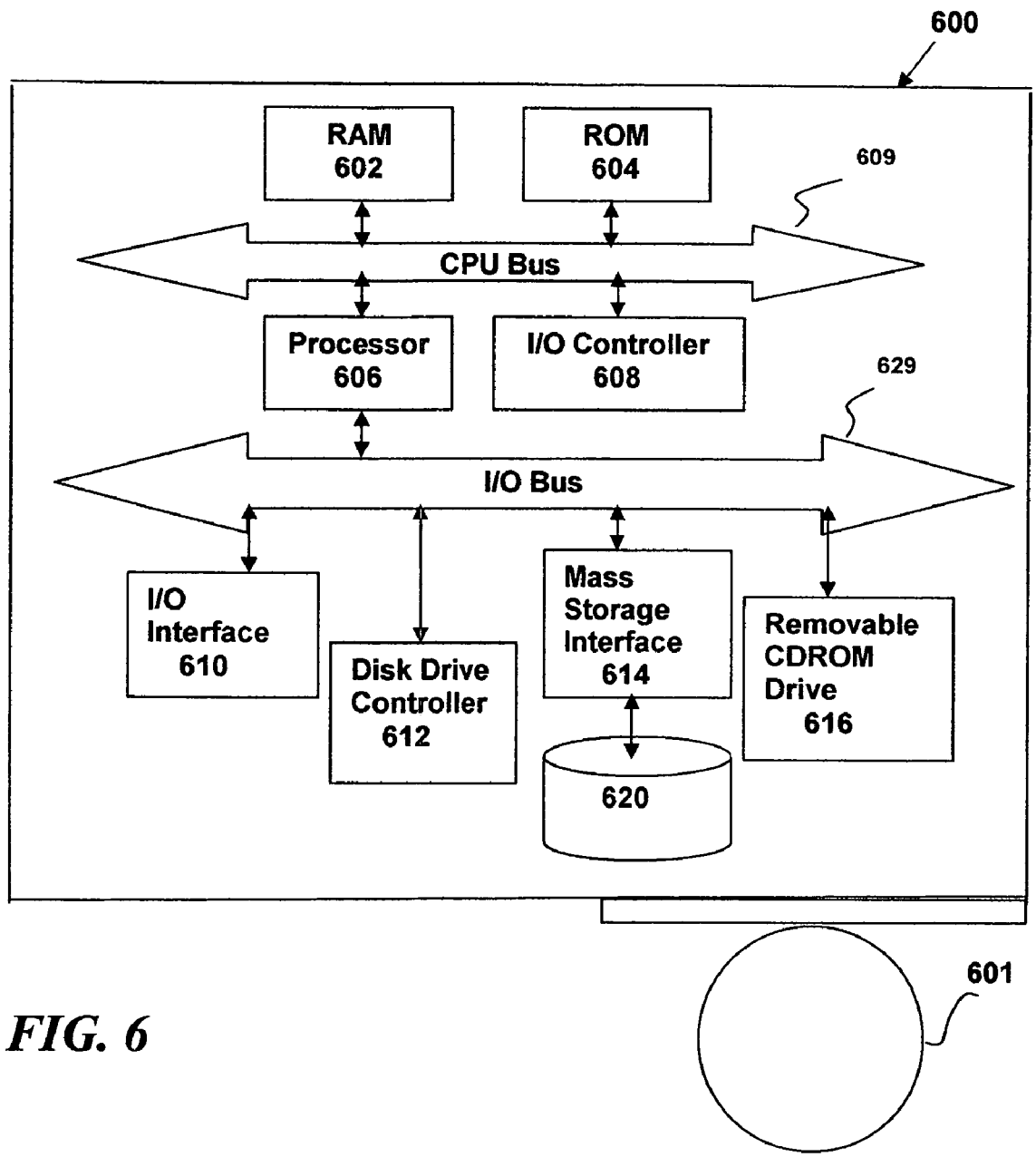
FIG. 6 shows a highly simplified version of an information processing system that can be configured to operate according to an aspect of the invention.

FIG. 6 is a simplified block diagram of a programmable computer that can be configured to operate according to an embodiment of the invention. According to an embodiment of the invention, a computer readable medium, such as a CDROM 601 can include program instructions for operating the programmable computer 600 according to the invention. The processing apparatus of the programmable computer 600 comprises: random access memory 602, read-only memory 604, a processor 606 and input/output controller 608. These are linked by a CPU bus 609. Additionally, there is an input/output bus 629, and input/output interface 610, a disk drive controller 612, a mass storage device 620, a mass storage interface 614, and a removable CDROM drive 616. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will be understood by those skilled in the art that other modifications can be made within the spirit of the invention.

We claim:

1. A computer-implemented method for producing a schema mapping transformation to allow selected data stored in at least one table in a source relational database having a first schema to be transported to a target relational database having a second schema while preserving integrity of said data and satisfying constraints of said target relational database, the method comprising:

identifying the first schema of the source relational database and the second schema of the target relational database;

developing a mapping transformation for mapping said first schema to said second schema;

converting said mapping transformation to a spreadsheet;

converting said spreadsheet into a computer interpretable language; and processing said spreadsheet in said computer interpretable language into a set of computer readable instructions for directing the computer to transform said selected data from said source relational database into a form suitable for the schema of said target relational database.

2. The method of claim 1 further comprising specifying conversion instructions in said spreadsheet to guide conversion of selected data from said source to target relational databases to assure conformity with constraints of said target relational database and data integrity.

3. The method of claim 2 wherein said conversion instructions comprise at least one key word specified in said spreadsheet.

4. The method of claim 3 further comprising:

extracting selected data from said source relational database;

loading said selected data into a temporary table in a database;

transforming said selected data into an intermediate set of data, for conformation with constraints of said target relational database while preserving data integrity;

extracting said intermediate data; and loading said intermediate data into said target relational database.

5. The method of claim 4 where said instructions cause generation of unique identifications for each row of a table in said target database to assure data integrity.

6. The method of claim 1 further comprising:

selecting tables and fields of tables of said source relational database from which selected data is to be moved;

selecting corresponding tables and fields of tables in said target relational database to which said selected data is to be moved;

selecting data transformation rules for conversion of data to be transported from said source to target databases, to satisfy target table constraints;

selecting schema transformation rules to permit conformation with said schema of said target database;

representing said transformation rules in a transformation spreadsheet;

converting said spreadsheet into an XML or other computer interpretable language;

using a suitable computer language parser to create a set of transformer computer instructions such to enable data transformation from source to target data; and selecting data and schema transformation rules for augmenting said selected data of said source database to conform to said schema of said target database to enforce a parent child relationship within said data which is present in said original data when transporting said selected data to said target database.

7. The method of claim 6 wherein said transformation rules include inserting an additional column in said table which was not present in said at least one table of said source database to normalize said selected data.

8. The method of claim 7 further including normalizing said selected data by:

generating an intermediate table corresponding to said selected source table for normalizing said data;

providing a table column for generation of primary keys for rows of said table;

extracting selected data from said table of said source database; transforming said selected data in conformity with said data and schema transformation rules;

generating primary keys for said selected data from said source database in accordance with said schema transformation rules;

populating said intermediate table with said selected data and said primary keys to form an intermediate set of data; and populating said tables of said target database with said intermediate set of data in accordance with said schema transformation rules.

9. The method of claim 7 further comprising populating said intermediate table is with data from at least one source table or table field in accordance with said data and schema transformation rules to form said intermediate set of data.

10. The method of claim 7 further comprising populating said target database table is with selected data from said intermediate database table and at least one source database table in accordance with said data and schema transformation rules.

11. The method of claim 1 wherein said mapping transformation includes application rules for transforming at least a subset of said selected data into a suitable form for use by an application program.

12. A computer-implemented data processing system for producing a schema mapping transformation to allow selected data stored in at least one table in a source relational database having a first schema to be transported to a target relational database having a second schema while preserving integrity of said data and satisfying constraints of said target relational database, comprising:

means for identifying the first schema of the source relational database and the second schema of the target relational database;

means for developing a mapping transformation for mapping said first schema to said second schema;

means for converting said mapping transformation to a spreadsheet;

means for converting said spreadsheet into a computer interpretable language; and means for processing said spreadsheet in said computer interpretable language into a set of computer readable instructions for directing the computer to transform said selected data from said source relational database into a form suitable for the schema of said target relational database.

13. The data processing system of claim 12 further comprising means for specifying conversion instructions in said spreadsheet to guide conversion of selected data from said source to target relational databases to assure conformity with constraints of said target relational database and data integrity.

14. The data processing system of claim 13 wherein said conversion instructions comprise at least one key word specified in said spreadsheet.

15. The data processing system of claim 14 further comprising:

means for extracting selected data from said source relational database;

means for loading said selected data into a temporary table in a database;

means for transforming said selected data into an intermediate set of data, for conformation with constraints of said target relational database while preserving data integrity;

means for extracting said intermediate data; and means for loading said intermediate data into said target relational database.

16. The data processing system of claim 15 where said instructions cause generation of unique identifications for each row of a table in said target database to assure data integrity.

17. The data processing system of claim 12 further comprising:

means for selecting tables and fields of tables of said source relational database from which selected data is to be moved;

means for selecting corresponding tables and fields of tables in said target relational database to which said selected data is to be moved;

means for selecting data transformation rules for conversion of data to be transported from said source to target databases, to satisfy target table constraints;

means for selecting schema transformation rules to permit conformation with said schema of said target database;

means for representing said transformation rules in a transformation spreadsheet;

means for converting said spreadsheet into an XML interpretable language;

using a suitable computer language parser to create a set of transformer computer instructions to enable data transformation from source to target data; and means for selecting data and schema transformation rules for augmenting said selected data of said source database to conform to said schema of said target database to enforce a parent child relationship within said data which is present in said original data when transporting said selected data to said target database.

18. The data processing system of claim 17 wherein said transformation rules include inserting an additional column in said table which was not present in said at least one table of said source database to normalize said selected data.

19. The data processing system of claim 18 further including means for normalizing said selected data, comprising:

means for generating an intermediate table corresponding to said selected source table for normalizing said data;

means for providing a table column for generation of primary keys for rows of said table;

means for extracting selected data from said table of said source database;

means for transforming said selected data in conformity with said data and schema transformation rules;

means for generating primary keys for said selected data from said source database in accordance with said schema transformation rules; means for populating said intermediate table with said selected data and said primary keys to form an intermediate set of data; and means for populating said tables of said target database with said intermediate set of data in accordance with said schema transformation rules.

20. The data processing system of claim 18 wherein said intermediate table is populated with data from at least one source table or table field in accordance with said data and schema transformation rules to form said intermediate set of data.

21. The data processing system of claim 18 wherein said target database table is populated with selected data from said intermediate database table and at least one source database table in accordance with said data and schema transformation rules.

22. The data processing system of claim 12 wherein said mapping transformation includes application rules for transforming at least a subset of said selected data into a suitable form for use by an application program.

23. A computer program product having program codes stored on a computer-usable medium for producing a schema mapping transformation to allow selected data stored in at least one table in a source relational database having a first schema to be transported to a target relational database having a second schema while preserving integrity of said data and satisfying constraints of said target relational database, the computer program product comprising:
   a program code for identifying the first schema of the source relational database and the second schema of the target relational database;
   a program code for developing a mapping transformation for mapping said first schema to said second schema;
   a program code for converting said mapping transformation to a spreadsheet;
   a program code for converting said spreadsheet into a computer interpretable language; and
   a program code for processing said spreadsheet in said computer interpretable language into a set of computer readable instructions for directing a computer to transform said selected data from said source relational database into a form suitable for the schema of said target relational database.

24. The computer program product of claim 23 further comprising a program code for specifying conversion instructions in said spreadsheet to guide conversion of selected data from said source to target relational databases to assure conformity with constraints of said target relational database and data integrity.

25. The computer program product of claim 24 wherein said conversion instructions comprise at least one key word specified in said spreadsheet.

26. The computer program product of claim 25 further comprising:
   a program code for extracting selected data from said source relational database;
   a program code for loading said selected data into a temporary table in a database;
   a program code for transforming said selected data into an intermediate set of data, for conformation with constraints of said target relational database while preserving data integrity;
   a program code for extracting said intermediate data; and
   a program code for loading said intermediate data into said target relational database.

27. The computer program product of claim 26 where said instructions cause generation of unique identifications for each row of a table in said target database to assure data integrity.

28. The computer program product of claim 23 further comprising:
   a program code for selecting tables and fields of tables of said source relational database from which selected data is to be moved;
   a program code for selecting corresponding tables and fields of tables in said target relational database to which said selected data is to be moved;
   a program code for selecting data transformation rules for conversion of data to be transported from said source to target databases, to satisfy target table constraints;
   a program code for selecting schema transformation rules to permit conformation with said schema of said target database;
   a program code for representing said transformation rules in a transformation spreadsheet;
   a program code for converting said spreadsheet into an XML interpretable language;
   a program code for using a suitable computer language parser to create a set of transformer computer instructions such to enable data transformation from source to target data; and
   a program code for selecting data and schema transformation rules for augmenting said selected data of said source database to conform to said schema of said target database to enforce a parent child relationship within said data which is present in said original data when transporting said selected data to said target database.

29. The computer program product of claim 28 wherein said transformation rules include a program code for inserting an additional column in said table which was not present in said at least one table of said source database to normalize said selected data.

30. The computer program product of claim 29 further including a program code for normalizing said selected data by:
   generating an intermediate table corresponding to said selected source table for normalizing said data;
   providing a table column for generation of primary keys for rows of said table;
   extracting selected data from said table of said source database; transforming said selected data in conformity with said data and schema transformation rules;
   generating primary keys for said selected data from said source database in accordance with said schema transformation rules; populating said intermediate table with said selected data and said primary keys to form an intermediate set of data; and
   populating said tables of said target database with said intermediate set of data in accordance with said schema transformation rules.

31. The computer program product of claim 29 further comprising a program code for populating said intermediate table with data from at least one source table or table field in accordance with said data and schema transformation rules to form said intermediate set of data.

32. The computer program product of claim 29 further comprising populating said target database table with selected data from said intermediate database table and at least one source database table in accordance with said data and schema transformation rules.

33. The computer program product of claim 29 wherein said mapping transformation includes application rules for transforming at least a subset of said selected data into a suitable form for use by an application program.

* * * * *